(12) United States Patent
Goloshchapov et al.

(10) Patent No.: US 11,973,830 B2
(45) Date of Patent: Apr. 30, 2024

(54) SYSTEM AND METHOD FOR STREAMING MEASUREMENT DATA

(71) Applicant: Siemens Aktiengesellschaft, Munich (DE)

(72) Inventors: Egor Goloshchapov, St. Petersburg (RU); Artem Vladimirovich Ozhigin, St. Petersburg (RU); Alexey Yurevich Tcymbal, St. Petersburg (RU); Sergey Vinogradov, St. Petersberg (RU); Sergey Sergeevich Zobnin, St. Petersburg (RU)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 96 days.

(21) Appl. No.: 17/254,739

(22) PCT Filed: Jun. 25, 2018

(86) PCT No.: PCT/RU2018/000420
§ 371 (c)(1),
(2) Date: Dec. 21, 2020

(87) PCT Pub. No.: WO2020/005090
PCT Pub. Date: Jan. 2, 2020

(65) Prior Publication Data
US 2021/0273999 A1    Sep. 2, 2021

(51) Int. Cl.
*G06F 15/16* (2006.01)
*H04L 41/022* (2022.01)
(Continued)

(52) U.S. Cl.
CPC ............ *H04L 67/12* (2013.01); *H04L 41/022* (2013.01); *H04L 43/026* (2013.01); *H04L 67/146* (2013.01)

(58) Field of Classification Search
CPC ..... H04L 67/12; H04L 67/146; H04L 41/022; H04L 43/026
(Continued)

(56) References Cited

U.S. PATENT DOCUMENTS 9,107,565 B2 *   8/2015   Jain ..................... G06Q 10/10
10,805,393 B2 *  10/2020  Grefen .................. H04L 67/12
(Continued)

FOREIGN PATENT DOCUMENTS

CA          3078130        6/2014
CN          103348598      10/2013

OTHER PUBLICATIONS

PCT International Search Report dated Mar. 15, 2019 based on PCT/RU2018/000420 filed Jun. 25, 2018.

*Primary Examiner* — Bharat Barot
(74) *Attorney, Agent, or Firm* — Cozen O'Connor

(57) ABSTRACT

A method, computer program product and system for streaming measurement data that includes a number of provider devices configured to provide a number of data streams that each include multiple structured data records indicative of measurement data obtained from a number of data sources of an industrial facility, a registry device configured to store, for each data stream, a semantics specification indicative of a semantics of the structured data records of the data stream; and a number of consumer devices configured to, for at least one data stream, (i) receive the data stream provided by the corresponding provider device, (ii) obtain the measurement data from the structured data records based on the semantics specification of the received data stream stored in the registry device, and (iii) consume the obtained measurement data, such that versatility is increased when multiple provider devices operate according to different semantics.

18 Claims, 3 Drawing Sheets

(51) Int. Cl.
*H04L 43/026* (2022.01)
*H04L 67/12* (2022.01)
*H04L 67/146* (2022.01)

(58) Field of Classification Search
USPC .................................. 709/223–224, 202–203
See application file for complete search history.

(56) References Cited

U.S. PATENT DOCUMENTS

| | | | |
|---|---|---|---|
| 10,896,756 B2* | 1/2021 | Cook | ..................... G06N 20/20 |
| 2011/0179007 A1* | 7/2011 | Shi | ........................ G06F 16/958 |
| | | | 709/223 |
| 2016/0182394 A1* | 6/2016 | Kiessling | .............. H04L 67/125 |
| | | | 370/230 |
| 2016/0315816 A1 | 10/2016 | Fang | |
| 2017/0124166 A1* | 5/2017 | Thomas | ................... H04L 69/08 |
| 2017/0168473 A1* | 6/2017 | Kohvakka | ............. H04L 67/125 |
| 2017/0331881 A1* | 11/2017 | Chandramouli | ........ H04L 67/12 |
| 2018/0121254 A1* | 5/2018 | Ghare | ................... G06F 9/5083 |
| 2019/0332084 A1* | 10/2019 | Haven | ................ G05B 19/402 |
| 2020/0285514 A1* | 9/2020 | Ghare | ....................... G06F 9/50 |

* cited by examiner

SYSTEM AND METHOD FOR STREAMING MEASUREMENT DATA

CROSS-REFERENCE TO RELATED APPLICATIONS

This is a U.S. national stage of application No. PCT/RU2018/000420 filed 25 Jun. 2018.

BACKGROUND OF THE INVENTION

1. Field of the Invention

The present invention relates to the field of industrial sensor data processing and more particularly to a system and method for streaming measurement data.

2. Description of the Related Art

In a modern industrial facility, such as a power plant, gas turbine or processing plant, a large number of data sources such as sensors are installed. A respective provider device may provide measurement acquired by a respective data source to a streaming platform implemented in a cloud or data center. The streaming platform may aggregate, process and/or store data streams of the measurement data. A number of consumer devices may consume the data streams of the streaming platform to perform analysis, monitoring and/or control of the industrial facility. A respective data stream may be a real-time, high-frequency data stream.

A problem exists in that in an industrial scenario, different provider devices may use different data representations for the data stream provided to the streaming platform. Likewise, different consumer devices may expect different data representations in the data streams consumed from the streaming platform. For example, when using a commercially available real-time data streaming platform, such as Apache Kafka or Confluent I/O, additional effort is required to provide interfaces between respective data sources, provider devices, consumer devices, and the streaming platform. Tedious and error prone development is required each time a new provider or consumer device is added to the system.

SUMMARY OF THE INVENTION

It is an object of the present invention to provide an improved system and method for streaming industrial high-frequency measurement data with increased versatility.

This and other objects and advantages are therefore achieved in accordance with the invention by a system for streaming measurement data that comprises a number of provider devices that are each configured to provide one or more of a number of data streams that each include a plurality of structured data records indicative of measurement data obtained from one of a number of data sources of an industrial facility, a registry device configured to store, for each of the number of data streams, a semantics specification indicative of a semantics of the plurality of structured data records of the respective data stream, and a number of consumer devices configured to, for at least one of the number of data streams (i) receive the respective data stream provided by the corresponding provider device, (ii) obtain the measurement data from the plurality of structured data records included in the received data stream based on the semantics specification of the received data stream stored in the registry device, and (iii) consume the obtained measurement data of the received data stream.

The proposed system may advantageously enable a respective consumer device to consume a variety of data streams structured according to a variety of semantics. The system may employ a variety of different provider devices and consumer devices while obviating the necessity to install an interface component on a respective provider and/or consumer device.

"Streaming", as used herein, may refer to one or more of transmitting, receiving and processing, in particular processing in real-time, of a number of data streams.

The term "a number of", as used herein, shall mean a number of one or more.

The proposed system may comprise a streaming platform. The streaming platform may comprise a number of computing resources. The number of computing resources may include at least the number of provider devices, the number of consumer devices the registry device, and zero, one or more further computing resources. The number of computing resources of the streaming platform may be interconnected using a network, such as a local area network (LAN), or a wide area network (WAN).

The streaming platform may be configured to provide one or more of the following functionalities: enabling a provider device to provide a data stream to the streaming platform, enabling a consumer device to consume a data stream from the streaming platform, temporarily or permanently storing a data stream; recovering a stored data stream, executing a streaming application on a data stream. A streaming application executed on a data stream may be configured to alter or transform the respective data stream and/or to perform an action, such as monitoring, analysis, and control, of the industrial facility based on the data stream.

As used herein, "provide a data stream" may mean directly transmitting the data stream to one of the number of consumer devices consuming the data stream and/or may mean transmitting the data stream to another computing resource of the streaming platform for further processing.

Conversely, "receive a data stream provided by a provider device" may mean directly receiving the data stream from the provider device and/or may mean receiving the data stream and/or a processed, altered or modified version thereof, from another computing resource of the streaming platform.

In other words, either no or any number of computing resources of the streaming platform may be interposed between a provider device and a consumer device.

In particular, the received data stream may have been altered by processing that has been performed on one or more of the number of computing resources of the streaming platform on the data stream provided by the provider device.

A respective data source may be configured to repeatedly acquire a measurement value from the industrial facility. A respective data source may be a sensor, such as a temperature sensor, or pressure sensor.

A respective provider device and a corresponding data source may be separate units connected to each other or may be formed as a respective integral unit.

A respective provider device may be connected to, or formed integrally with, any number of data sources and may provide any number of data streams to the streaming platform.

A data stream may be a signal or a sequence of data packets in transmission. A data stream may comprise a plurality of structured data records. Each structured data record may comprise a representation of a respective measurement value as one piece of measurement data and may further comprise zero or any number of further representations of further other pieces of measurement data such as a timestamp, a manufacturer code, and the like. Each structured data record may be formatted in a format such as JavaScript Object Notation (JSON), or Extensible Markup Language (XML).

"Semantics", herein, may refer to a data representation or information that can be used to retrieve a piece of measurement data, such as a measurement value, from a respective structured data record. For example, "semantics" may refer to a respective field name or identifier of a field containing a representation of a respective piece of the measurement data. A "semantics specification" may refer to a representation of a semantics in a machine-readable form.

The semantics specifications of the number of data streams may be, for example, pre-stored in the registry device. When a further provider device is added to the system, an engineer may register a corresponding further semantics specification in the registry device without having to alter the further provider device, install an interface component on a component such as the further provider device.

The phrase "obtain the measurement data based on the semantics specification" may refer to accessing a respective specific field of a respective structured data record, where a respective specific field is a field that contains the representation of a respective piece (portion) of the measurement data, and reading the respective piece of the measurement data, such as the measurement value, from the specific field, where the respective specific field is identified among a plurality of fields comprised by the structured data record based on the semantics specification.

In accordance with an embodiment, a respective consumer device may receive the semantics specification from the registry device so as to be able to determine the respective specific field based on the semantics specification.

In accordance with another embodiment, another computing resource may receive the semantics specification from the registry device, may determine the respective specific field based on the semantics specification, and which may add a respective tag or the like to the specific field in the structured data record of the data stream. A respective consumer device may access the respective specific field by locating the respective tag in the structured data record of the data stream.

Both contemplated embodiments shall be encompassed by the phrase "obtaining the measurement data based on the semantics specification".

"Consuming the obtained measurement data" may refer to any processing that is carried out using the obtained measurement data as input data. In particular, "consuming the obtained measurement data" may refer to performing processing that has a technical effect, such as monitoring, analysis or control of the industrial facility, based on the obtained measurement data. The processing may be performed by the consumer device, by another computing resource of the streaming platform connected to the consumer device, or by an external unit connected to the consumer device.

It should be noted "obtaining the measurement data" and "consuming the obtained measurement data" may also include a case where "at least portions of the measurement data" are obtained and/or consumed and not all of the measurement data included in the data stream is obtained and/or consumed.

In the proposed system, the semantics specifications stored in the registry device may advantageously be used to make the measurement data indicated in the structured data records available to a respective consumer device. Herein, a provided device may use any semantics, and, more particular, is not required to use a pre-agreed semantics. Thereby, versatility of the data streaming system may be increased in cases where an industrial data streaming application is built from a heterogenous plurality of data sources and/or provider devices.

In accordance with another embodiment, the registry device is configured to provide an interface for registering one or more of the semantics specifications.

The interface may be an interface for automated interaction, such as an Application Programming Interface (API) or a web interface, and/or may be an interface for human interaction such as a display and an input device, such as a keyboard, mouse, or touch panel.

Thereby, a versatility when registering new provider devices when expanding the system may be increased.

In accordance with a further embodiment, the registry device is configured to determine one or more of the semantics specifications by parsing semantics information about the corresponding data stream, where the semantics information is received from the corresponding provider device.

The "semantics information" may be any information provided by the corresponding provider device of the data stream that enables the registry device to determine a semantics specification for the data stream. For example, the semantics information may be a textual specification of the structure of the structured data records comprising, for example, names of fields and their meanings and the like.

That is, the registry device may determine a respective semantics specification automatically through interaction with the provider device. An engineer building or expanding the system may be favorably relieved from the burden of registering respective semantics specifications for each provider device with the registry device.

In accordance with a further embodiment, the semantics information received by the registry device comprises at least one of the plurality of structured data records of the corresponding data stream.

Herein, in order to automatically determine the semantics information, the registry device may subscribe to a data stream provided by a respective provider device. That is, the semantics specification may be determined by parsing a sample of the actual data stream.

Thereby, favorably, the registry device may automatically determine a respective semantics specification without special support by a corresponding provider device, solely based on the data stream provided by the provider device. The registry device may use a heuristic approach, and/or artificial intelligence to automatically determine the respective semantics specification.

In accordance with a further embodiment, a respective of the plurality of structured data records comprises a number of fields, each field including a value and a field identifier associated with the value, and a respective of the number of semantics specifications comprises a mapping between each of a number of predetermined tags and a corresponding one of the field identifiers.

It should be noted that the number of fields may be greater than one. That is, apart from a field including the measurement value as a value, a structured data record may include further fields including further values, such as a timestamp, a version number, a sensor identifier, or a manufacturer identifier.

The number of predetermined tags may be understood as a syntax predefined in the proposed system. A tag, and/or a respective instance thereof, may refer to a string or textual label, such as "<sensor_value>", "<timestamp_value>", or "<sensor_name>". A respective tag may be associated with a corresponding piece of measurement data, such as a measurement value, a timestampe value, or a sensor name.

The mapping may be an array, a hash table or any other machine-readable data structure allowing to determine a corresponding field identifier for a given predetermined tag.

A device, such as the consumer device, a tagging device or the like, which is interested in determining, among the number of fields included in a structured data record of a given data stream, a specific field including a specific piece of measurement data, may obtain the semantics specification of the data stream from the registry device, may query the mapping included in the semantics specification using a known predetermined tag associated with the specific piece of measurement data, such as "<sensor_value>", may obtain, as a response to the query, the field identifier, among the plurality of field identifiers, which is associated to the specific field including the specific piece of measurement data.

Thereby, advantageously, the consumer device may not be required to know a specific semantics of a data stream provided by a provider device, but it may be sufficient to know the syntax or semantics of the predetermined tags. This may advantageously allow the increase of the reusability of code implemented on the consumer device for data streams provided by a variety of heterogenous provider devices with different semantics.

In accordance with an embodiment, the parsing of the received semantics information includes matching each of a number of patterns defined for each of the number of predetermined tags against each of a number of field identifiers included in the received semantic information.

A respective pattern may be a wildcard pattern, or a regular expression.

Thereby, advantageously, common portions of field identifiers that are commonly found in data streams provided by data sources and/or provider devices manufactured by different manufacturers, such as the string "*value*", may be pre-stored in the registry device and may be used to automatically determine a respective semantics specification.

In accordance with a further embodiment, at least one of the number of consumer devices is further configured to receive the semantics specification of the respective data stream from the registry device.

That is, for example, rather than hardcoding specific field names used in the consumer device, the consumer device may be configured to communicate with the registry device to obtain, for a given data stream, the corresponding field name based on a predetermined tag.

Reusability of the consumer device for various data streams provided by various provider devices may be favorably enhanced.

In accordance with another embodiment, the system for streaming measurement data further comprises a tagging device configured to, for at least one of the number of data streams (i) receive, from the registry device, the semantics specification of the respective data stream, (ii) receive the respective data stream provided by a corresponding one of the provider devices, (iii) modify the received data stream by inserting, based on the received semantics specification, instances of one or more of the number of predetermined tags into the plurality of structured data records of the modified data stream, and (iv) forward the modified data stream to each of the number of consumer devices consuming the corresponding data stream.

The tagging device may be one of the number of computing resources of the streaming platform. The tagging device and the registry device may be formed as an integrated or the same unit or may be formed as separate units connected to each other.

That is, a respective data stream may travel, directly or via a number of further computing resources, from the provider device to the tagging device. The tagging device may insert instances (copies) of one or more of the predetermined tags into each of the plurality of structured data records in accordance with the received semantics information of the respective data stream. The modified data stream including the tagged structured data records may then travel from the tagging device, directly or via a number of further computing resources, to the consumer device.

The instances of the predetermined tags in the modified data stream may aid the consumer device in locating pieces of interest of the measurement data, such as a measurement value, in the structured data records of the modified data stream without requiring knowledge of the detailed semantics of the (modified) data stream.

In accordance with a further embodiment, the tagging device is configured to, for each field of each of the plurality of structured data records, if it is determined, based on the semantics specification, that the field identifier of the respective field corresponds to one of the predetermined tags, associate an instance of the corresponding one of the predetermined tags with the field identifier.

Associating an instance of a predetermined tag with a field identifier may refer to placing the instance of the predetermined tag in positional association with the field identifier, such as next to, before, after, or near to the field identifier.

The tagging device may thus flag each field identifier associated with a field including a piece of measurement data which is known in the pre-defined syntax of the proposed system by placing an instance of a corresponding predetermined tag.

Thereby, the recognition of individual pieces of measurement data in the structured data records of the modified data stream is facilitated.

In accordance with a further embodiment, a respective one of the number of consumer devices is configured to obtain the measurement data from the plurality of structured data records by accessing a number of fields of a respective structured data record, each of the accessed number of fields having an associated field identifier that is associated with one of the predetermined tags.

That is, the consumer device may locate a predetermined tag corresponding to a piece of measurement data of interest in the structured data record, may thereby identify, out of a plurality of fields comprised by the structured data record, a field next to, near to, before or after the instance of the predetermined tag, and may read the value of the identified field to obtain the desired piece of measurement data. This procedure may be repeated for each piece of measurement data for which a corresponding predetermined tag is defined in the proposed system until the entire measurement data (or each piece of interest thereof) is obtained.

That is, the consumer may favorably neither require prior knowledge about a semantics of the data stream. Further, a necessity for the consumer device to communicate with the registry device to obtain a corresponding semantics specification is obviated. The consumer device may access pieces of measurement data of interest easily by referring to the instances of the predetermined tags inserted into the data stream.

In accordance with a further embodiment, consuming the obtained measurement data includes providing the obtained measurement data to an external unit connected to the system for streaming measurement data.

That is, the consumer device may comprise an interface device for coupling a third-party device to the proposed system and providing the obtained measurement data to the third-party device in accordance with a predetermined format.

In accordance with a further embodiment, consuming the obtained measurement data includes storing the obtained measurement data into a historical database comprised by the system for streaming measurement data.

It should be noted the obtained measurement data may only comprise pieces of measurement data for which a corresponding predetermined tag is defined in the proposed system. Other pieces of measurement data that may also be included into a data stream by some of the provider devices but which do not correspond to any of the predetermined tags defined in the proposed system may not be included in the obtained measurement data. Therefore, by storing only the obtained measurement data obtained from a respective of the data streams, an amount of storage space of the historical database used for storing the measurement data may be reduced in comparison to storing the entire data stream provided by the provider device.

In accordance with a further embodiment, consuming the obtained measurement data includes performing, on the consumer device and/or a number of further devices connected to the consumer device and comprised by the system for streaming measurement data, at least one of analysis, monitoring, and control of the industrial facility using the obtained measurement data.

Versatility of analysis, monitoring and control of the industrial facility may be favorably improved by allowing a variety of data sources using different semantics to be added to the proposed system without requiring a special configuration or interface to be implemented on the respective data sources and/or their corresponding provider devices.

In accordance with a further embodiment, the measurement data is high-frequency measurement data obtained from the number of data sources with a frequency of 1 kHz or higher.

It should be noted that tagging a high-frequency data stream with a frequency of 1 kHz, more preferably 10 kHz, or greater may require a considerable amount of computing power. Therefore, in accordance with the presently contemplated embodiment, the tagging device may be preferably implemented by a plurality of computing resources of a distributed high-performance streaming platform.

In accordance with a further embodiment, number of data streams comprise a number of real-time data streams provided by the number of provider devices and received by the number of consumer devices in real time.

In particular, the tagging device may be configured to perform the tagging on a live data stream in real time.

Thereby, the above-mentioned advantages associated with tagged data streams may be made available to real-time analysis and/or control processing performed by a high-performance, real-time, data-center or cloud-based streaming platform.

An engineer tasked with developing such real-time analysis and/or control processing may be relieved from the burden of dealing with various differing semantics used by various of the provider devices.

The respective entity, e.g., a respective provider device, the registry device, the tagging device, and a respective consumer device, may be implemented in hardware and/or in software. If the respective entity is implemented in hardware, it may be formed as a device, e.g., as a computer or as a processor or as a part of a system, e.g., a computer system. If the respective entity is implemented in software it may be formed as a non-transitory computer program product (e.g., a computer-readable medium), as a function, as a routine, as a program code or as an executable object.

Any embodiment of the disclosed system may be combined with any embodiment of the system to obtain another embodiment of the system.

It is also an object of the invention to provide a method for streaming measurement data that comprises providing, by each of a number of provider devices, one or more of a number of data streams each including a plurality of structured data records indicative of measurement data obtained from one of a number of data sources of an industrial facility, storing, in a registry device, for each of the number of data streams, a semantics specification indicative of a semantics of the plurality of structured data records of the respective data stream, and performing, by a number of consumer devices and for at least one of the number of data streams (i) receiving the respective data stream provided by the corresponding provider device, (ii) obtaining the measurement data from the plurality of structured data records included in the received data stream based on the semantics specification of the received data stream stored in the registry device, and (iii) consuming the obtained high-frequency measurement data of the received data stream.

The embodiments and features described with reference to the proposed system for streaming measurement data apply mutatis mutandis to the proposed method for streaming measurement data.

It is also an object of the invention to provide a computer program product (computer-readable medium) comprising program code for executing the above-described method for streaming measurement data when run on at least one computer.

A computer program product, such as a computer program means, may be formed as a memory card, USB stick, CD-ROM, DVD or as a file which may be downloaded from a server in a network. For example, such a file may be provided by transferring the file comprising the computer program product from a wireless communication network.

Further possible implementations or alternative solutions also encompass combinations—that are not explicitly mentioned herein—of features described above or below with regard to the embodiments. The person skilled in the art may also add individual or isolated aspects and features to the most basic form of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further embodiments, features and advantages will become apparent from the subsequent description and dependent claims, taken in conjunction with the accompanying drawings, in which:

DETAILED DESCRIPTION OF THE EXEMPLARY EMBODIMENTS

Figure 1:
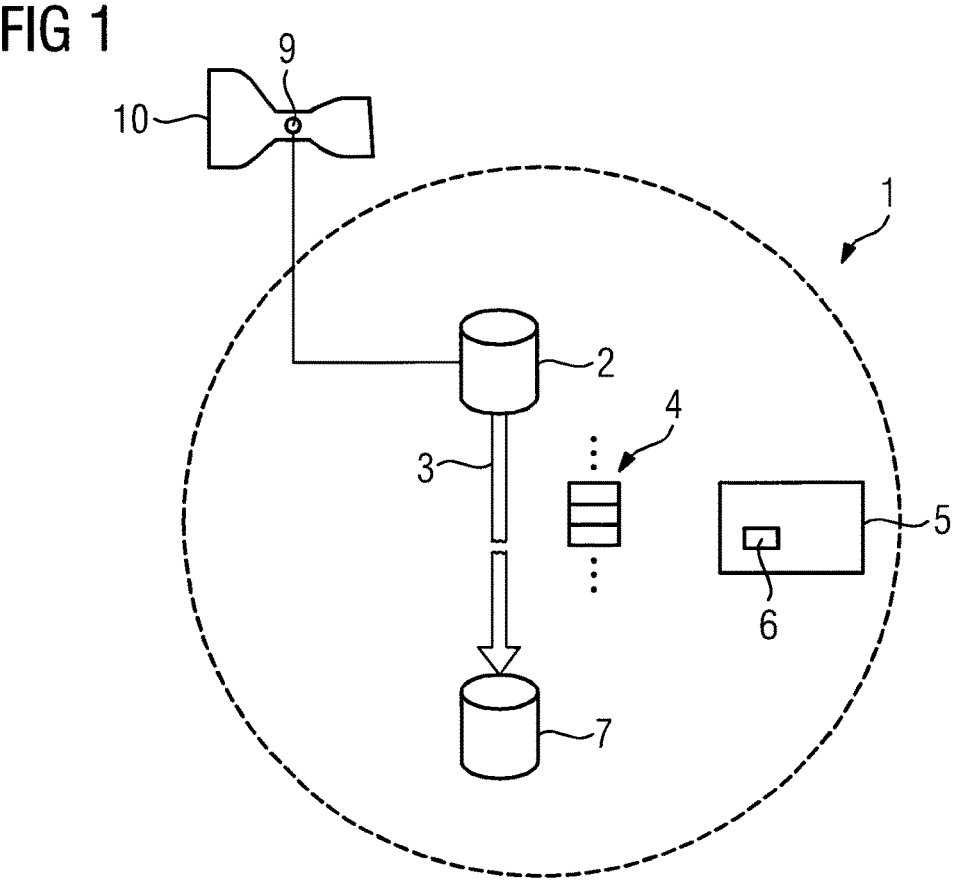
FIG. 1 shows a system for streaming measurement data in accordance with a first exemplary embodiment.

In the Figures, like reference numerals designate like or functionally equivalent elements, unless otherwise indicated.

Figure 2:
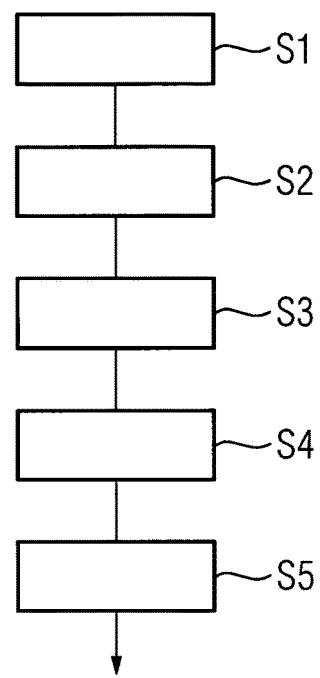
FIG. 2 shows a method for streaming measurement data in accordance with the first exemplary embodiment.

FIG. 1 shows a system 1 and FIG. 2 shows a corresponding method for streaming measurement data according to the first exemplary embodiment.

The system 1 comprises a data provider device (provider device) 2, a registry device 5 and a data consumer device (consumer device) 7. The data provider device 2 is connected to a sensor 9 (example of a data source) installed in a gas turbine 10 (example of an industrial facility).

In step S1 of the method of the first exemplary embodiment, the data provider device 2 repeatedly acquires measurement data from the sensor 9 installed in the gas turbine 10 and creates a data stream 3 including a plurality of structured data records 4.

Each structured data record 4 is indicative of measurement data obtained during a respective acquisition and may comprise a plurality of pieces of measurement data such as a measurement value, a sensor name, or a timestamp. Each structured data record 4 of the data stream 3 is structured according to a semantics specific to the data provider device 2 and/or the sensor 9 (also referred to as "semantics of the data stream 3").

In step S2, a semantics specification 6 is stored in the registry device 5. The semantics specification 6 is indicative of the semantics of the data stream 3.

In step S3, the data consumer device 7 receives the data stream 3 that is provided by the data provider device 2. It should be noted that the data consumer device 7 is not aware of the semantics of the data stream 3. That is, no information on the semantics of the data stream 3 is configured in the data consumer device 7.

Nevertheless, in step S4, the data consumer device 7 obtains at least portions of the measurement data included in the plurality of structured data records 4 included in the received data stream 3.

More specifically, the obtaining of the at least portions of the measurement data from the data stream 3 by the data consumer device 7, which is unaware of the semantics of the data stream 3, is enabled by the semantics specification 6 stored in the registry device 5.

In step S5, the obtained measurement data (at least the obtained portions thereof) included in the plurality of structured data records 4 of the data stream 3 is consumed.

It should be noted that steps S1 through S5 are not required to be performed, and are typically not performed, in this particular order. Specifically, steps S1 and steps S3 to S5 may be executed in parallel to each other and may each be repeated in continuous loops, whereas step S2 is executed at least once before a first execution of step S4.

In accordance with the first exemplary embodiment, owing to the semantics specification 6 stored in the registry device 5, the data consumer device 7 can successfully consume at least portions of the measurement data included in the data stream 3 also in a case where there is no agreement between the data provider device 2 and the data consumer device 7 on a common semantics for the data stream 3.

The benefits of this technique may become more salient when considering that, in a typical real-world scenario of using a streaming system 1 to process measurement data acquired in an industrial facility 10, there may typically be dozens, hundreds or even thousands of data sources 9 with corresponding data provider devices 2, which typically do not supply data according to a common semantics, but rather use varying semantics native to a respective of the data provider devices 2 and/or data sources 9.

In accordance with one further development of the first exemplary embodiment, the data consumer device 7 consumes the obtained measurement data by performing processing for analysis, monitoring and/or control of the gas turbine 10 using the obtained measurement data as input data of said processing.

In accordance with another further development of the first exemplary embodiment, the data consumer device 7 provides the obtained measurement data to an external unit (not shown in FIG. 1; 11 in FIG. 4) connected thereto.

Figure 3:
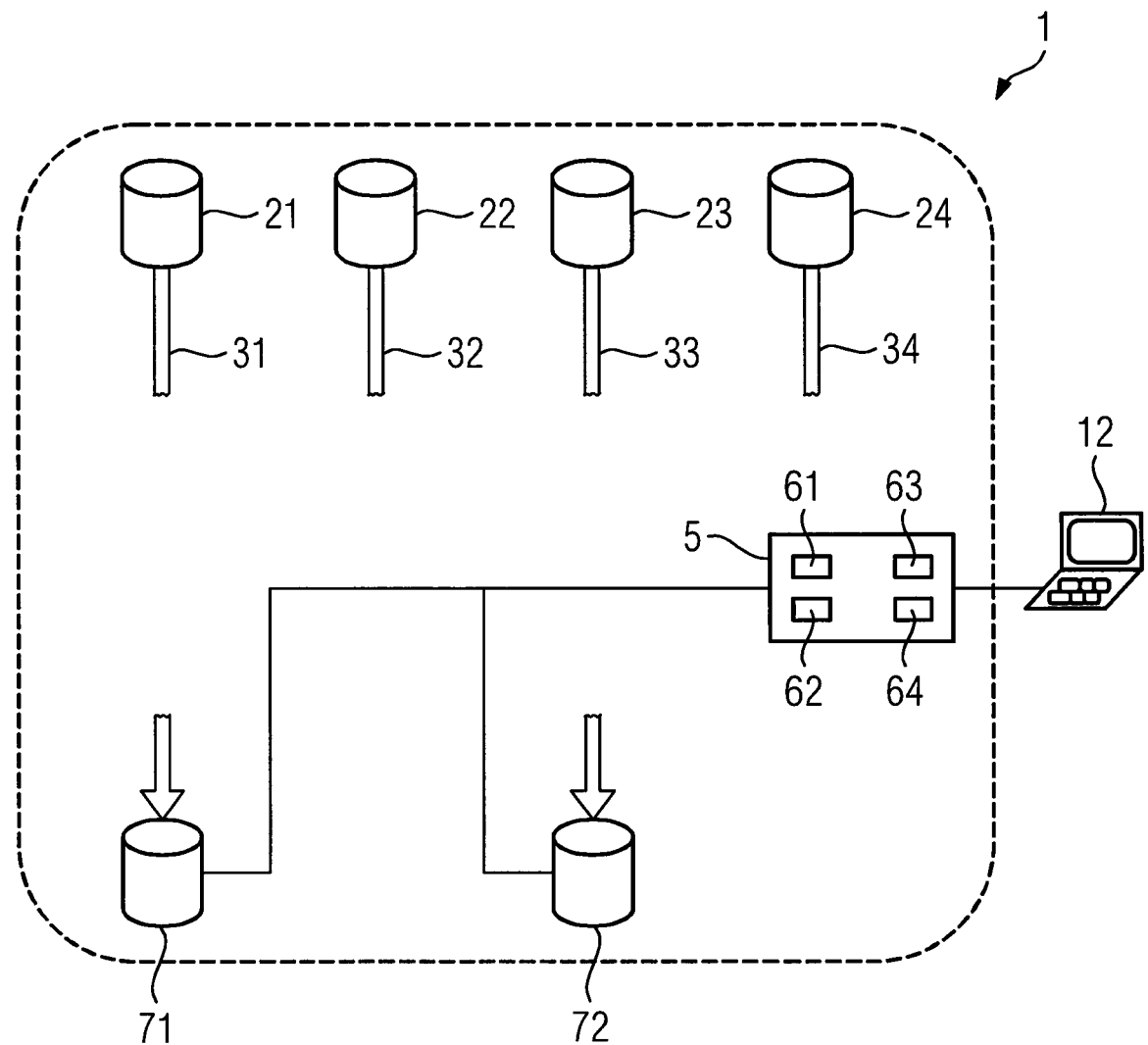
FIG. 3 shows a system for streaming measurement data in accordance with a second exemplary embodiment.

FIG. 3 shows a system 1 for streaming measurement data according to a second exemplary embodiment.

The system of FIG. 3 may be a cloud-based streaming platform 1 and comprises at least four data provider devices 21, 22, 23, 24, two data consumer devices 71, 72 and a registry device 5. The streaming platform 1 may comprise an arbitrary number of interconnected further computing resources in addition to the devices (computing resources) 21, 22, 23, 24, 71, 72 and 56.

Each of the data provider devices 21, 22, 23, 24 provides a corresponding data stream 31, 32, 33, 34 to the streaming platform 11. Each data stream 31, 32, 33, 34 uses a specific semantics particular to the respective data stream 31, 32, 33, 34 and/or data provider device 21, 22, 23, 24.

Elements shown in FIG. 1 but not in FIG. 3 may nevertheless be present in the second exemplary embodiment, but are not illustrated for purposes of brevity. Specifically, although not shown in FIG. 3, also the data streams 31, 32, 33, 34 include a respective plurality of structured data records (4 in FIG. 1) indicative of measurement data obtained from a respective of a plurality of data sources (9 in FIG. 1) installed in an industrial facility (10 in FIG. 1).

The registry device 5 provides a programming interface for registering semantics specifications 61, 62, 63, 64 for each of the data streams 31, 32, 33, 34 provided to the streaming platform 11. An engineer, when building and/or upgrading the system 1, may use an assistance device 12 to connect to the registry device 5 and store the semantics specifications 61, 62, 63, 64 therein.

Each of the data consumer devices 71, 72 may receive any of the data streams 31, 32, 33, 34 present in the streaming platform 11.

When, for example, the second data consumer device 72 wants to receive the third data stream 33 provided by the third data provider device 23, the second data consumer device 72 connects to the registry device 5 and asks for the semantics specification 63 of the third data stream 33.

Upon receiving the semantics specification 63 of the third data stream 33 from the registry device 5, the second data consumer device 72 applies the received semantics specification 63 to obtain the measurement data included in the plurality of structed data records (4 in FIG. 1) included in the received third data stream 33. The second data consumer device 72 then consumes the obtained measurement data.

Similar processing is performed when any of the data consumer devices 71, 72 wants to receive any of the data streams 31, 32, 33, 34 provided by any of the data provider devices 21, 22, 23, 24, and a description thereof will not be repeated.

It should be noted that a respective data stream 31, 32, 33, 34 may pass through an arbitrary number of further computing resources (not shown) interposed between a respective data provider device 31, 32, 33, 34 and a respective data consumer device 71, 72.

Figure 4:
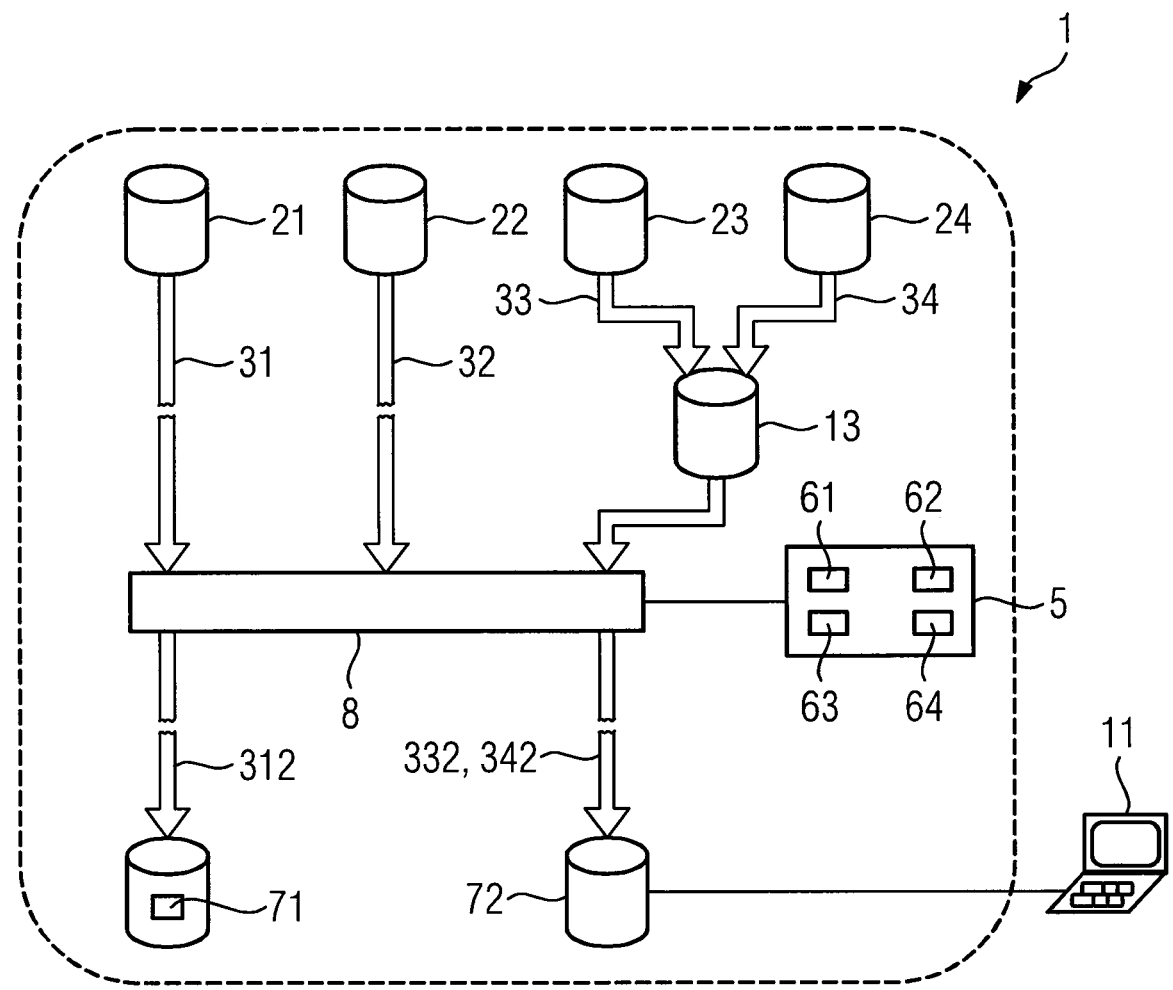
FIG. 4 shows a system for streaming measurement data in accordance with a third exemplary embodiment.

FIG. 4 shows a system 1 for streaming measurement data in accordance with a third exemplary embodiment.

The system of FIG. 4 may be a cloud-based streaming platform 1. The streaming platform 1 of FIG. 4 differs from the streaming platform of FIG. 3 in that the streaming platform 1 comprises a tagging device 8, a further computing resource 13, and in that the registry device 5 is not connected to an assistance device 12. These differences will now be described in more detail.

Specifically, the first data stream 31 provided by the first data provider device 21 may comprise a plurality of structured data records (4 in FIG. 1) using a first semantics as shown below:
  sensorValue: double
  timestamp: long
  id: string Herein, "sensorValue", "timestamp" and "id" are field identifiers, and "double", "long" and "string" are data types of corresponding field values.

That is, for example, if the plurality of structured data records of the first data stream 31 are indicative of pressure values measured by a pressure sensor named "press", a sequence of two consecutive structured data records (4 in FIG. 1) of the first data stream 31 may be represented as follows:
  sensorValue: 350.7
  timestamp: 1528444828
  id: press1
  sensorValue: 348.7
  timestamp: 1528444829
  id: press1

The second data stream 32 may use the same semantics as the first data stream 31, but may provide a value of "press2" for the "id" field.

The third data stream 33 and the fourth data stream 34 provided by the third and fourth data provider devices 33, 34 may each comprise a plurality of structured data records using a second semantics as shown below:
  manufacturer: string
  sensorName: string
  temperature: float
  utime: long That is, one of the structured data records of the third data stream 33 may be represented as follows:
  manufacturer: SIE
  sensorName: temp1
  temperature: 1321.8
  utime: 1528444829

One of the structured data records of the fourth data stream 34 may be represented as follows:
  manufacturer: SIE
  sensorName: temp2
  temperature: 1139.3
  utime: 1528444829

It should be noted that the above representations and formats are illustrative examples, and that the respective structured data records may also be formatted in a machine-readable format such as JavaScript Object Notation (JSON), or Extensible Markup Language (XML).

Herein, in order to perform processing such as analysis, monitoring and control of the industrial facility (10 in FIG. 1), a respective data consumer device 71, 72 may be interested in certain pieces of measurement data of interest, such as a respective sensor value (pressure or temperature) and a respective sensor name. However, without further manual configuration and without support by the streaming platform 11, the consumers devices 71, 72 would be "blind" for the semantics of the respective data streams 31, 32, 33, 34, i.e., the consumer devices 71, 72 would not know which of the fields of the respective structured data records contain the pieces of measurement data of interest.

Therefore, in the streaming platform 11, a predetermined syntax comprising the predetermined tags "<value>" and "<name>" is defined for (agreed upon by or known to) the plurality of data consumer devices 71, 72, the tagging device 8 and the registry device 5.

A respective semantics definition 61, 62, 63, 64 stored in the registry device 5 comprises a mapping between the predetermined tags and the field identifiers of a corresponding data stream 31, 32, 33, 34.

For example, given the exemplary structured data records of the various data streams 31, 32, 33, 34 shown above, the semantics definitions 61 and 62 may each be represented as follows:
  <value>: sensorValue
  <name>: id The semantics definitions 63 and 64 may each be represented as follows:
  <value>: temperature
  <name>: sensorName In the presently contemplated embodiment, for example, the tagging device 5 may be configured to automatically determine the semantics definitions 61 to 64.

More particularly, the tagging device 5 may acquire one of the plurality of structured data records of each of the data streams 31-34. The acquired one of the plurality of structured data records of each of the data streams 31, 32, 33, 34 may also be referred to as a "sample" of the respective data stream 31, 32, 33, 34 and/or as "semantics information", i.e., information from which a semantics of the respective data stream 31, 32, 33, 34 may be derived.

The registry device 5 may subscribe to each of the data streams 31, 32, 33, 34 to receive a respective sample directly from a respective data provider device 21, 22, 23, 24 and/or may be provided with a respective sample from the tagging device 8, which is subscribed to each of the data streams 31, 32, 33, 34, as will be explained hereinbelow.

The registry device 5 then parses each of the acquired samples to determine a respective semantics specification 61, 62, 63, 64 of the respective data stream 31, 32, 33, 34.

More particularly, for each of the predetermined tags, a number of patterns may be defined or stored in the registry device 5. For example, for the predetermined tag "<value>", a pattern such as "*valu*", a pattern such as "*temp*" and a pattern such as "*pres*" may be defined in the registry device 5. Likewise, for the predetermined tag "<name>" a pattern such as "*nam*|*id*" may be defined in the registry device 5.

The registry device 5 may match each of the patterns defined for each of the predetermined tags against the field identifiers comprised by each of the received samples.

For example, for the first data stream 61, upon receiving the following sample,
  sensorValue: 350.7
  timestamp: 1528444828
  id: press1
the registry device 5 may determine that the field identifier "sensorValue" matches the pattern "*valu*" defined for the predetermined tag "<value>" and may therefore add a mapping between the predetermined tag "<value>" and the field identifier "sensorValue" to the semantics specification 61 of the first data stream 31.

Similar pattern matching processing may be repeated for each field identifier of each of the samples and will not be described in detail.

In this way, the semantics specifications 61, 62, 63, 64 stored in the registry device 5 may be determined automatically.

In accordance with the presently contemplated embodiment, the consumer devices 71, 72 do not communicate with the registry device 5 to obtain the semantics specifications 61, 62, 63, 64. Rather, the tagging device 8 performs tagging of the data streams 31, 32, 33, 34, which is now described in more detail.

The tagging device 8 may be subscribed to each of the data streams 31, 32, 33, 34.

More specifically, in accordance with one example, the tagging device 8 receives the first data stream 31 provided by the first data provider device 21 and the second data stream 32 provided by the second data provider device 22. The third data stream 33 provided by the third data provider device 23 and the fourth data stream 34 provided the fourth data provider device 24 are received by a further computing resource 13 of the streaming platform 1. The further computing resource 13 may perform processing such as preprocessing, sanity checking, and merging of the third and fourth data streams 33, 34 and may transmit a combined data stream 33, 34 to the tagging device 8.

Thus, the tagging device 8 receives the first and second data streams 31, 32 and the combined data stream 33, 34. The tagging device 8 further queries the registry device 5 for the corresponding semantics specifications 61, 62, 63, 64 and receives the semantics specifications 61, 62, 63, 64 from the registry device 5.

For each of the received data streams 61, 62, 63, 64, the tagging device 8 creates a modified data stream 312, 332, 342 by inserting, based on the received semantics specifications 61, 62, 63, 64, instances of the predetermined tags "<value>" and "<name>" into each of the plurality of structured data records (4 in FIG. 1).

More specifically, the tagging device 8 inserts a respective predetermined tag (an instance thereof) into a respective structured data record such that the inserted instance of the respective predetermined tag is positionally associated with (such as placed next to, before or after) a field identifier corresponding to the respective predetermined tag according to the mapping comprised by the respective semantics specification 61, 62, 63, 64.

For example, if a structured data record of the first data stream 31 may be represented as follows,
  sensorValue: 350.7
  timestamp: 1528444828
  id: press1
and if the semantics specification 61 of the first data stream 31 comprises a mapping that may be represented as follows:
  <value>: sensorValue
  <name>: id
then the tagging device 8 may, for example, create a structured data record of the modified first data stream 312 that may be represented as follows:
  sensorValue<value>: 350.7
  timestamp: 1528444828
  id<name>: press1

Likewise, if two structured data records of the combined data stream 33, 34 may be represented as follows,
  manufacturer: SIE
  sensorName: temp1
  temperature: 1321.8
  utime: 1528444829
  manufacturer: SIE
  sensorName: temp2
  temperature: 1139.3
  utime: 1528444829
and if the semantics specifications 63, 64 of the third and fourth data streams 33, 34 comprise a mapping that may be represented as follows,
  <value>: temperature
  <name>: sensorName
then the tagging device 8 may, for example, create two structured data records of the modified combined data stream 332, 342 that may be represented as follows:
  manufacturer: SIE
  sensorName<name>: temp1
  temperature<value>: 1321.8
  utime: 1528444829
  manufacturer: SIE
  sensorName<name>: temp2
  temperature<value>: 1139.3
  utime: 1528444829

The tagging device 8 then forwards the modified first data stream 312 to the first data consumer device 71 and forwards the modified combined third and fourth data stream 332, 342 to the second data consumer device 72.

Similar tagging processing may also be performed for the second data stream 32 and a further data consumer device (not shown) consuming the second data stream 32.

As appreciable from the exemplary representations of exemplary structured data records of the modified data streams 312, 332, 342 shown above, the data consumer devices 71, 72 may advantageously be able to access the pieces of measurement data of interest (i.e. the values 350.7, 1139.3, 1321.8 and the corresponding sensor names) based on the instances of the predetermined tags inserted into the respective modified data streams 312, 332, 342.

Specifically, when receiving a respective structured data record of the modified data stream 312, the consumer device 71 may iterate through each field of the structured data record. For each field, the consumer device 71 may determine whether a field identifier of the field is tagged with one of the predetermined tags "<value>" or "<name>". If the field identifier is tagged with the predetermined tag "<value>" (field identifier "sensorValue" in the example above), then the consumer device 71 may access the value of the field (350.7) and identify the accessed value as the piece of measurement data of interest, i.e., as the sensor value. If the field identifier is tagged with the predetermined tag "<name>" (field identifier "id" in the example above), then the consumer device 71 may accesses the value of the field and identify the accessed value ("press1") as a further piece of measurement data of interest, i.e., as the sensor name. If the field identifier is not tagged, or is tagged with an unknown tag, then the consumer device 71 may disregard the value of the field and move on to the next field.

Similar processing is performed by the data consumer device 72 and a description thereof will not be repeated for reasons of brevity.

The data consumer devices 71, 72 may consume the pieces of measurement data of interest obtained in such a way for any purpose related to, for example, analysis, monitoring and/or control of the industrial facility (10 in FIG. 1).

For example, in accordance with the third exemplary embodiment, the data consumer device 71 may store the pieces of measurement data such obtained in a historical database 14 for later retrieval. Storing the pieces of measurement data in this way may require less storage space than storing the entire first data stream 31, because pieces of measurement data of no interest (such as the "manufacturer" field in the examples above) may be discarded.

For example, the second data consumer device 72 may provide the obtained measurement data to the external unit 11, which may be a third-party unit running a third-party software for analysis of the industrial facility (10 in FIG. 1).

In accordance with another embodiment, for example, processing for analysis, monitoring and/or control of the industrial facility (10) based on the obtained measurement data may be performed by one or more of the data consumer devices 71, 72.

Although the present invention has been described in accordance with preferred embodiments, it will be understood by the person skilled in the art that modifications are possible in all embodiments.

The tagging device 8, the registry device 5 and a respective data consumer device 71, 72 have been described as separate, single devices. However, one or more of the devices 8, 5, 71, 72 may also be embodied together as a single device, or may be embodied as a plurality of distributed interconnected computing resources arranged in a data center or cloud.

By implementing the streaming platform 1 in a data center or cloud, sufficient computing power may be provided to perform the processing of a large number of high-frequency data streams acquired with a frequency of 1 kHz or above in real time.

In the second exemplary embodiment, the semantics specifications 61, 62, 63, 64 are received by the data consumer devices 71, 72 and the data consumer devices 71, 72 extract portions of the measurement data based on the semantics specifications 61, 62, 63, 64. In the fourth embodiment, the semantics specifications 61-64 are provided to the tagging device 8, and the data consumer devices 71, 72 extract portions of the measurement data based on instances of the predetermined tags inserted into the modified data streams 312, 332, 342 by the tagging device 8. However, also the second exemplary embodiment may use the tagging device 8, and also in the third exemplary embodiment, the data consumer devices 71, 72 may directly receive the semantics specifications from the tagging device 5.

In the second exemplary embodiment, the registry device 5 provides an interface for registering the tagging specifications 61, 62, 63, 64, whereas in the third exemplary embodiment, the registry device 5 employs pattern matching to automatically determine the semantics specifications 61, 62, 63, 64. However, also in the second exemplary embodiment, the registry device 5 may employ pattern matching, and also in the third exemplary embodiment, the registry device 5 may provide an interface for registering semantics specifications 61, 62, 63, 64 and/or for verifying and modifying the semantics specifications 61, 62, 63, 64 that were automatically determined.

The number of predetermined tags is not limited to the examples "<value>" and "<id>". If further pieces of the measurement information, such as a timestamp, and the like, are of interest, further predetermined tags, such as "<time>", may be defined in the proposed system 1.

The disclosed embodiments of the present invention may be identified as a data-center or cloud-based streaming platform 1 for providing, consuming, and performing processing based on a plurality of data streams 3, 31, 32, 33, 34, where information on a respective semantics of a respective data stream 3, 31, 32, 33, 34 is made available to consumer devices 7, 71, 72 in the form of semantics specifications 6, 61, 62, 63, 64 stored in a registry device 5 and/or in the form of tags inserted by a tagging device 8 into the plurality of data streams 3, 31, 32, 33, 34. A respective data stream 3, 31, 32, 33, 34 may include measurement data acquired from a data source 9 in an industrial facility 10, and the processing performed by the streaming platform 1 may be related to monitoring, analysis, and control of the industrial facility 10.

Specifically, no specific configuration, interface component and the like may be required on the side of the data provider devices 2, 21, 22, 23, 24 providing the plurality of data streams 3, 31, 32, 33, 34. More particularly, a respective data provider device 2, 21, 22, 23, 24 may provide a respective data stream 3, 31, 32, 33, 34 using a respective native semantics of the respective data provider device 2, 21, 22, 23, 24. Likewise, no specific configuration, interface component or knowledge about the various native semantics used by the respective data provider devices 2, 21, 22, 23, 24 may be required on the side of the data consumer devices 7, 71, 72.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A system for streaming measurement data comprising:
a number of provider devices configured to provide a number of data streams including a plurality of structured data records indicative of measurement data obtained from at least one of a number of sensors of an industrial automation facility;
a registry device configured to store, for each of the number of data streams, a semantics specification com- prising a textual specification of a structure of the plurality of structured data records of a respective data stream; and a number of consumer devices configured to, for at least one of the number of data streams:
(i) receive the respective data stream provided by a corresponding provider device;
(ii) obtain the measurement data from the plurality of structured data records included in the received data stream based on the semantics specification comprising the textual specification of the structure of the received data stream stored in the registry device; and
(iii) consume the obtained measurement data of the received data stream.

2. The system according to claim 1, wherein the registry device is configured to provide an interface for registering one or more of the semantics specifications.

3. The system according to claim 1, wherein the registry device is configured to determine one or more of the semantics specifications by parsing semantics information about the corresponding data stream, said semantics information being received from the corresponding provider device.

4. The system according to claim 2, wherein the registry device is configured to determine one or more of the semantics specifications by parsing semantics information about the corresponding data stream, said semantics information being received from the corresponding provider device.

5. The system according to claim 3, wherein the semantics information received by the registry device comprises at least one of the plurality of structured data records of the corresponding data stream.

6. The system according to any of claim 1, wherein a respective structured data record of the plurality of structured data records comprises a number of fields, each field including a value and a field identifier associated with the value; and
wherein a respective semantics specification of the number of semantics specifications comprises a mapping between each of a plurality of predetermined tags and a corresponding one of the field identifiers.

7. The system according to claim 6, wherein said parsing of the received semantics information includes matching each of a plurality of patterns defined for each of the number of predetermined tags against each of a number of field identifiers included in the received semantic information.

8. The system according to claim 6, wherein at least one consumer device of the number of consumer devices is further configured to receive the semantics specification of the respective data stream from the registry device.

9. The system according to claim 7, wherein at least one consumer device of the number of consumer devices is further configured to receive the semantics specification of the respective data stream from the registry device.

10. The system according to claim 6, further comprising:
a tagging device configured to, for at least one of the number of data streams:
(i) receive, from the registry device, the semantics specification of the respective data stream,
(ii) receive the respective data stream provided by a corresponding one of the provider devices,
(iii) modify the received data stream by inserting, based on the received semantics specification, instances of at least one predetermined tag of the number of predetermined tags into the plurality of structured data records of the received data stream to obtain a modified data stream; and
(iii) forward the modified data stream to each of the number of consumer devices consuming the corresponding data stream.

11. The system according to claim 7, further comprising:
a tagging device configured to, for at least one of the number of data streams:
(i) receive, from the registry device, the semantics specification of the respective data stream,
(ii) receive the respective data stream provided by a corresponding one of the provider devices,
(iii) modify the received data stream by inserting, based on the received semantics specification, instances of at least one predetermined tag of the number of predetermined tags into the plurality of structured data records of the received data stream to obtain a modified data stream; and
(iii) forward the modified data stream to each of the number of consumer devices consuming the corresponding data stream.

12. The system according to claim 10, wherein the tagging device is configured to, for each field of each of the plurality of structured data records, if it is determined, based on the semantics specification, that the field identifier of the respective field corresponds to one predetermined tag of the predetermined tags, associate an instance of the corresponding one of the predetermined tags with the field identifier.

13. The system according to claim 6, wherein a respective consumer device is configured to obtain the measurement data from the plurality of structured data records of the at least one of the number of data streams by accessing a number of fields of a respective structured data record, each of the accessed number of fields being a field having an associated field identifier which is associated with one of the predetermined tags.

14. The system according to any of claim 1, wherein consuming the obtained measurement data includes at least one of:
(i) providing the obtained measurement data to an external unit connected to the system for streaming measurement data;
(ii) storing the obtained measurement data into a historical database comprised by the system for streaming measurement data; and
(iii) performing, on at least one of the consumer device and a number of further devices connected to the consumer device and comprised by the system for streaming measurement data, at least one of analysis, monitoring, and control of the industrial automation facility utilizing the obtained measurement data.

15. The system according to claim 1, wherein the measurement data comprises high-frequency measurement data obtained from the number of sensors with a frequency of 1 kHz or higher.

16. The system according to claim 1, wherein the number of data streams comprise a number of real-time data streams provided by the number of provider devices and received by the number of consumer devices in real time.

17. A method for streaming measurement data comprising:
providing, by each of a number of provider devices, one or more of a number of data streams each including a plurality of structured data records indicative of measurement data obtained from one of a number of sensors of an industrial automation facility;

storing, in a registry device, for each of the number of data streams, a semantics specification comprising a textual specification of a structure of the plurality of structured data records of the respective data stream; and performing, by a number of consumer devices and for at least one of the number of data streams, the steps of:
 receiving the respective data stream provided by the corresponding provider device;
 obtaining the measurement data from the plurality of structured data records included in the received data stream based on the semantics specification comprising the textual specification of the structure of the received data stream stored in the registry device; and
 consuming the obtained high-frequency measurement data of the received data stream.

18. A non-transitory computer-readable medium encoded with program code which, when executed by at least one computer, causes streaming of measurement data, the program code comprising:

program code for providing, by each of a number of provider devices, one or more of a number of data streams each including a plurality of structured data records indicative of measurement data obtained from one of a number of sensors of an industrial automation facility;

program code for storing, in a registry device, for each of the number of data streams, a semantics specification comprising a textual specification of a structure of the plurality of structured data records of the respective data stream; and program code for performing, by a number of consumer devices and for at least one of the number of data streams, the steps of:
 receiving the respective data stream provided by the corresponding provider device;
 obtaining the measurement data from the plurality of structured data records included in the received data stream based on the semantics specification comprising the textual specification of the structure of the received data stream stored in the registry device; and
 consuming the obtained high-frequency measurement data of the received data stream.

* * * * *